United States Patent [19]
Brickel

[11] 3,990,279
[45] Nov. 9, 1976

[54] BI-CIRCLE LOCK
[75] Inventor: Barry Brickel, N. Miami Beach, Fla.
[73] Assignee: Lawrence Peska Associates, Inc., New York, N.Y. ; a part interest
[22] Filed: July 8, 1975
[21] Appl. No.: 593,940

[52] U.S. Cl. ................................................ 70/233
[51] Int. Cl.[2] ........................................ B62H 5/16
[58] Field of Search ........................ 70/18, 233, 234

[56] References Cited
UNITED STATES PATENTS
2,451,100  10/1948  LeCompte ........................ 70/233 X
3,611,760  10/1971  Muther ................................. 70/18
FOREIGN PATENTS OR APPLICATIONS
889,972   9/1953   Germany ............................. 70/234

Primary Examiner—Richard E. Moore

[57] ABSTRACT

A locking apparatus is disclosed suitable for mounting on a bicycle comprising a flexible securing member such as a cable or a chain secured to a reel at a point between the ends of the cable or chain thereby allowing the ends to be payed out or reeled in. This arrangement allows the reel and the housing over the reel if such housing is to be used to be attached to a bicycle and both can be constructed of very light weight materials. The cable or chain can be of sufficient length that it may be completely run through the back wheel, the frame and the front wheel of a bicycle and then the ends of the cable or chain secured to one another through lock receiving members at the ends thereof. When the cable is employed in the foregoing manner and additionally placed around a pole or other object securely imbedded in the ground, the cable is locked to itself and the bicycle so that even though the housing may be pried off of the bicycle, the cable will remain locked to it and the pole or post and neither the bicycle or the cable and housing can be stolen.

5 Claims, 3 Drawing Figures

BI-CIRCLE LOCK

SUMMARY OF THE INVENTION

Locking apparatus is disclosed comprising a flexible securing member such as a cable or a chain affixed to a reel at a point between the ends of said cable or chain for paying out and reeling in both ends of the cable or chain at the same time. The ends of the cable or chain have lock receiving members for locking the ends together.

DETAILED DESCRIPTION OF THE SEVERAL VIEWS OF THE DRAWING

DETAILED DESCRIPTION

The prior art discloses several devices for locking articles such as bicycles or skis comprising reel members having a chain or cable payed out therefrom. These prior art devices however depend on the cable or chain being secured to the reel or reel housing containing such reel in such a fashion that the reel or the housing has to be of a high strength.

It is therefor an object of the present invention to overcome these and other difficulties encountered in the prior art.

It is a further object of the present invention to provide a locking apparatus comprising a chain or cable mounted on a reel optionally in a housing wherein the housing or reel does not have to be a high strength material or securely fastened to the article that is to be locked or made secure.

These and other objects have been achieved according to the present invention and will become apparent by reference to the disclosure and claims that follow as well as the appended drawing.

Figure 1:
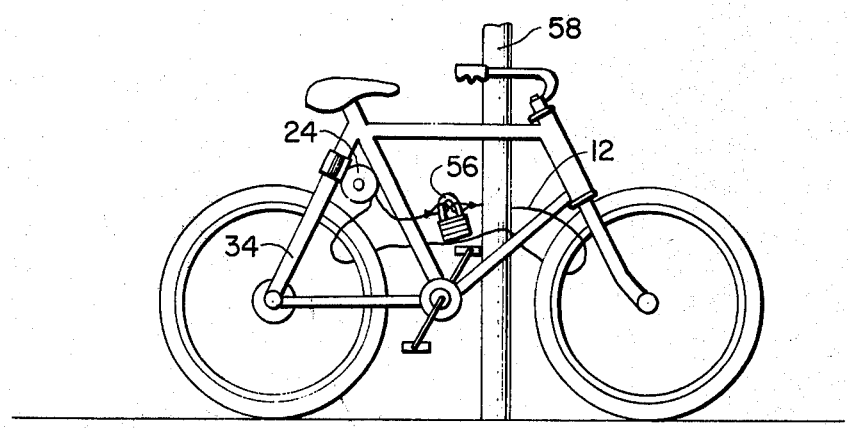
FIG. 1 illustrates a side elevation of the locking apparatus securing a bicycle to a pole imbedded in the ground according to one embodiment of the present invention.
Figure 2:
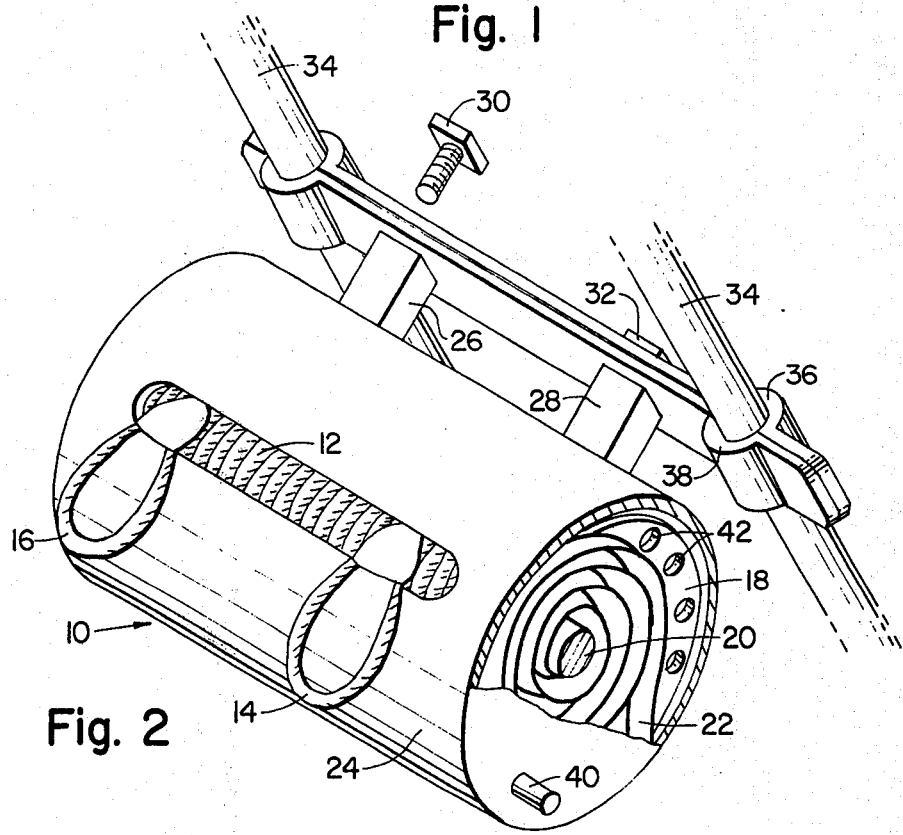
FIG. 2 is a perspective view partially in section of the locking apparatus secured to a bicycle frame according to one embodiment of the present invention.
Figure 3:
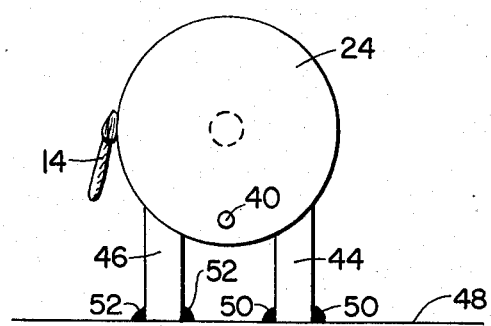
FIG. 3 is a side elevation of the locking apparatus secured to the frame of a boat trailer through supporting members welded to such frame according to one embodiment of the present invention.

Referring to FIGS. 1 through 3 a locking apparatus 10 is illustrated having a flexible securing member such as a cable 12 with ends 14 and 16. The flexible securing member 12 may also comprise a chain or any of the art known equivalents thereof. Cable 12 is affixed to a reel 18 at a point between the ends thereof and in the embodiment illustrated at a point approximately intermediate the ends of cable 12. This arrangement permits the ends 14 and 16 of cable 12 to be payed out or reeled in at the same time so they may be secured to a relatively immovable object such as a post 58 and locked together by means of lock 56 passing through the lock receiving loops at the ends 14 and 16. Reel 18 has a housing 24 mounted over it, housing 24 having an opening therein to allow the ends 14 and 16 of cable 12 to be payed out or reeled in through the housing. A torque loadable resilient member such as coil spring 22 is secured at one end to housing 24 and at the other end to axle 20 on which reel 18 is rotatably mounted in housing 24. A reel lock comprisng pin 40 is provided in housing 24 to engage any one of the several openings 42 placed on the circumference of reel 18 by sliding through housing 24 and into such openings. Mounting brackets 26 and 28 or 44 and 46 are provided and are secured to and extend from housing 24 so that the locking apparatus can be attached to a bicycle frame 34 or a trailer 48. Members 26 and 28 are threaded internally to receive bolts 30 and 32 through clamping members 36 and 38 which are opposed flat strips that extend arcuately in a semi-circle to engage the tubular frame members 34 of a bicycle. In another embodiment housing 24 is secured to a trailer by welding members 44 and 46 through welds 50 and 52 to trailer frame 48.

In use, ends 14 and 16 of cable 12 are withdrawn from housing 24 and end 14 extended through the back wheel and the frame and the end 16 extended through the front wheel and the frame of a bicycle whereupon a re-wind torque is applied to spring 22. Reel lock 40 is then depressed to engage any one of the holes 42 on reel 18. The ends 14 and 16 are then joined together and secured one to the other by means of a padlock 56. Cable 12 is of sufficient length to extend around and through the back wheel, the front wheel and the frame of a bicycle in the manner illustrated so that the bicycle can be secured to post 58 which is firmly imbedded in or secured to the ground. If the housing 24 is removed from the bicycle, neither the bicycle, or cable 12 can be removed since the locking apparatus does not depend on the cable 12 being locked to the housing 24 to be secured nor does the housing have to be locked to the bicycle. For this reason, the reel 18 and housing 24 may be of a simple light weight and inexpensive construction.

Upon removing lock 56, the cable 12 is unstrung from the frame and the wheels of the bicycle and the reel lock pulled outward. Upon releasing lock 40, the spring 22 unwinds and causes reel 18 to rewind cable 12 thereon automatically until cable 12 is completely taken back onto reel 18.

Although the invention has been described by reference to some embodiments, it is not intended that the novel locking apparatus is to be limited thereby, but that some modifications are intended to be included as falling within the broad scope and spirit of the foregoing disclosure, the following claims and the appended drawing.

What is claimed is:

1. Locking apparatus comprising flexible securing means affixed to reel means at a point between the ends of said flexible means for paying out and reeling in both ends of said flexiblle means at the same time, the ends of said flexible means having lock receiving means for locking said ends together, said reel means being mounted on housing means, axle means for rotationally mounting said reel means on said housing means, said reel being affixed to said axle means, mounting means extending from said housing means for mounting said apparatus on an article that is to be locked.

2. The apparatus of claim 1, where said reel means comprises a self-winding reel having locking means for locking said reel when said reel is paying out or reeling in said flexible securing means.

3. The apparatus of claim 2 where said housing means comprises closure means, said reel is enclosed in said closure means, opening means in said closure for paying out and reeling in said flexible securing means therethrough, axle means for rotationally mounting said reel in said closure, said reel being affixed to said axle means, torque loadable resilient means secured at one end to said axle means and at the other end to said closure means, said mounting means extending from said closure means for mounting said apparatus on an article that is to be locked.

4. The apparatus of claim 3 where said resillient member comprises coil spring means, one end of which is secured to said axle and the other end of which is secured to said closure.

5. The apparatus of claim 3 where said reel is attached to a bicycle through said mounting means, said flexible securing member being of a sufficient length to extend from said reel through the back wheel, around the frame and through the front wheel of said bicycle and then back again to said reel.

* * * * *